No. 678,238. Patented July 9, 1901.
G. W. FUNDERBURGH.
CHICKEN COOP.
(Application filed Apr. 16, 1901.)
(No Model.)

Witnesses
Geo. E. Frech.
M. A. Leonard

Inventor
George W. Funderburgh
By Kensey Tough
Attorneys

THE NORRIS PETERS CO., PHOTO-LITHO., WASHINGTON, D. C.

UNITED STATES PATENT OFFICE.

GEORGE W. FUNDERBURGH, OF SPRINGVALLEY, OHIO.

CHICKEN-COOP.

SPECIFICATION forming part of Letters Patent No. 678,238, dated July 9, 1901.

Application filed April 16, 1901. Serial No. 56,126. (No model.)

*To all whom it may concern:*

Be it known that I, GEORGE W. FUNDERBURGH, a citizen of the United States, residing at Springvalley, in the county of Greene and State of Ohio, have invented new and useful Attachments for Chicken-Coops, of which the following is a specification.

My invention bears directly upon disinfecting chicken houses or coops in such manner as to rid the fowls of lice and vermin and improve the coop from a hygienic standpoint, thus enabling the production of clean and healthy fowls. I attain these objects by the attachments illustrated in the accompanying drawings, in which—

Figure 1:
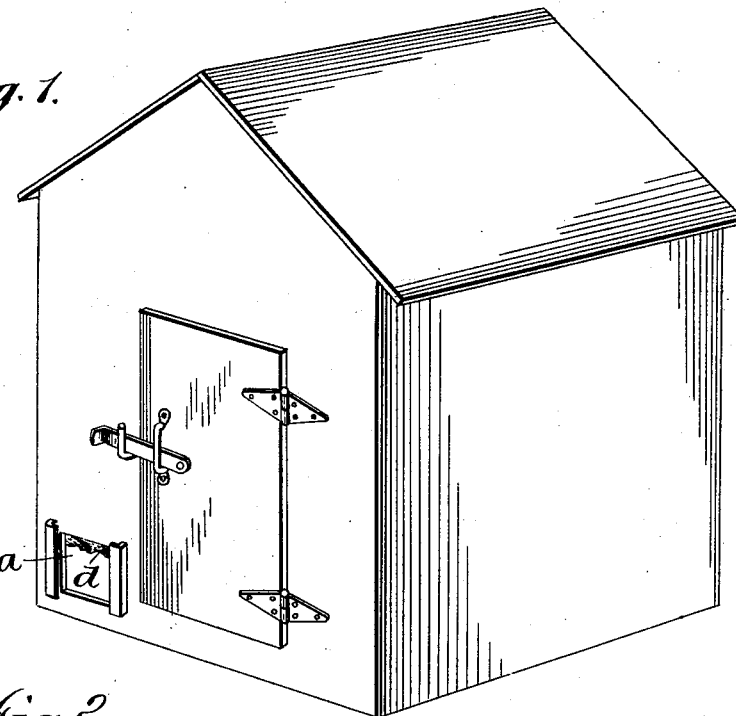
Figure 5:
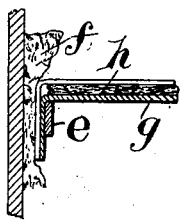
Figure 2:
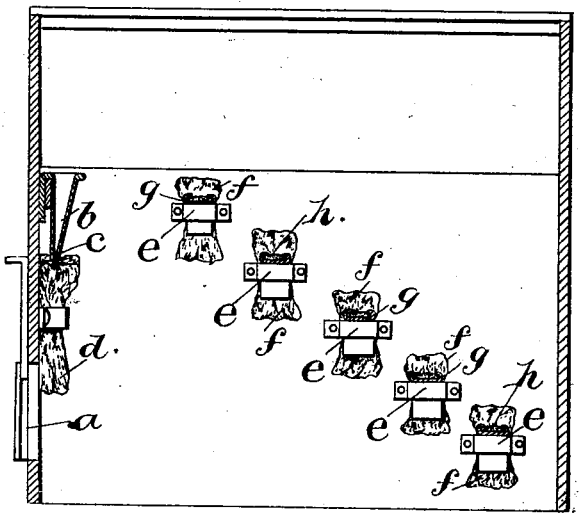
Figure 3:
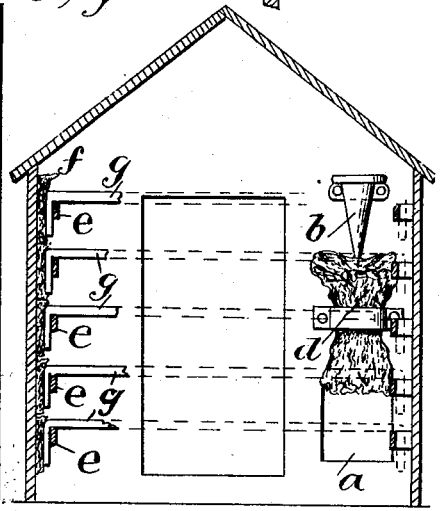
Figure 4:
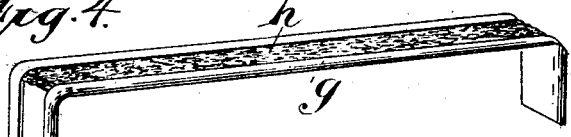

Figure 1 is a perspective of a chicken-house; Fig. 2, a cross-section of side of house; Fig. 3, a cross-section of front of house; Fig. 4, a roost; Fig. 5, attachment of roost to side of house.

Similar letters refer to similar parts throughout the several views.

$a$ represents the opening for the entrance and exit of fowls, $b$ a cone-shaped cup with small vent at $c$, and $d$ a sponge attached to front wall directly under cup $b$ and in contact with cup at opening $c$; said sponge extending below the top of opening $a$. The cup $b$ is to be filled with petroleum, carbolic acid, or any liquid disinfectant or combination of disinfectants, said disinfectant to run through opening $c$, and coming in contact with the sponge at this point the latter absorbs the disinfectant and becomes saturated. The chickens in entering and leaving the house come in contact with the lower part of the saturated sponge, and in forcing a way past this slight obstruction rub the back against the sponge and in this manner the disinfectant is applied to the fowl.

$g$ represents a roost the ends of which are bent down and so constructed as to fit into stationary holders, which are attached to the sides of the house. Between the sides of the house and the roost-holder $e$ and fastened to the side of the house is a piece of sponge $f$, sufficiently large to extend above and below the end of the roost, as shown in Fig. 2. This sponge is from time to time saturated with a disinfectant similar to the one used in cup $b$. Both ends of the roost coming in contact in this manner with a thoroughly-disinfected sponge, it makes it impossible for lice or other vermin of like nature to reach the fowls by crawling up the walls and onto the perch or roost. To the top side of the roost bits of sponge or other porous substance is fastened and disinfected by applying the same kind of disinfectant before mentioned.

Having thus described my invention, what I claim as new, and desire to secure by Letters Patent, is—

An attachment for coops consisting of a roost having its ends bent down at right angles, said roost having on its upper surface a porous material adapted to absorb and hold a disinfectant, stationary holders attached to opposite walls of the coop and adapted to receive the turned-down ends of the roost, porous material attached to the walls of the coop and extending behind the stationary holders and adapted to absorb and hold a disinfectant coming in contact with the porous material on the roost.

In testimony whereof I affix my signature in presence of two witnesses.

GEORGE W. FUNDERBURGH.

Witnesses:
W. V. LUCE,
EVALINE LUCE.